(No Model.)

F. H. CARTER.
BARREL TRUCK.

No. 548,951. Patented Oct. 29, 1895.

Witnesses:

Inventor:
Floyd H. Carter
By A. O. Behel
Atty.

UNITED STATES PATENT OFFICE.

FLOYD H. CARTER, OF SHIRLAND, ILLINOIS.

BARREL-TRUCK.

SPECIFICATION forming part of Letters Patent No. 548,951, dated October 29, 1895.

Application filed June 17, 1895. Serial No. 553,167. (No model.)

*To all whom it may concern:*

Be it known that I, FLOYD H. CARTER, a citizen of the United States, residing at Shirland, in the county of Winnebago and State of Illinois, have invented certain new and useful Improvements in Barrel-Trucks, of which the following is a specification.

The object of this invention is to construct a barrel-truck in which the barrels may be carried in an upright position.

Figure 1:
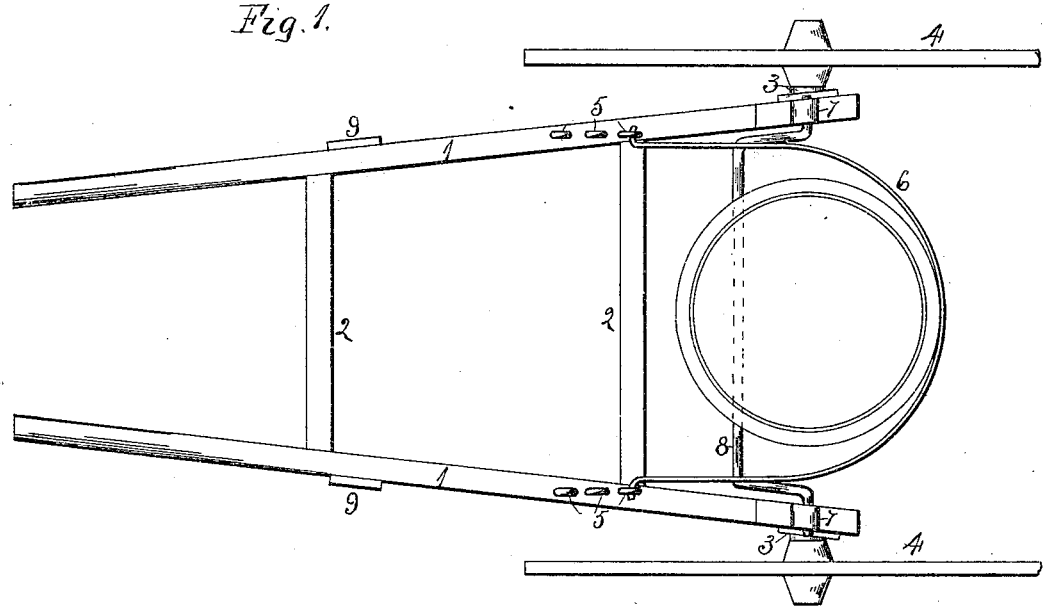
Figure 2:
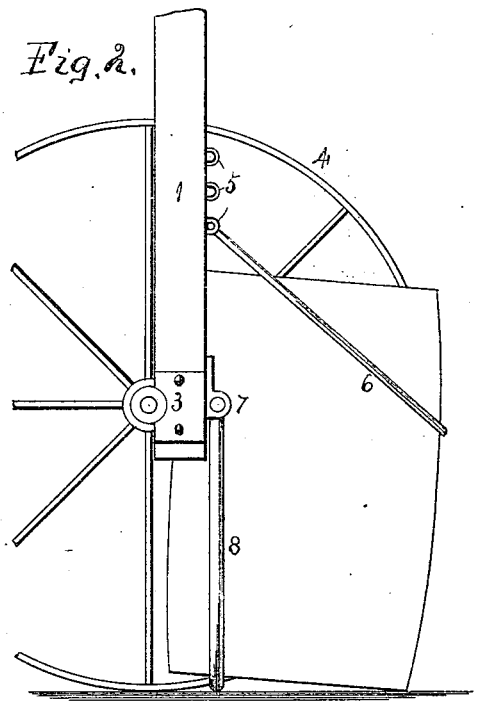
Figure 3:
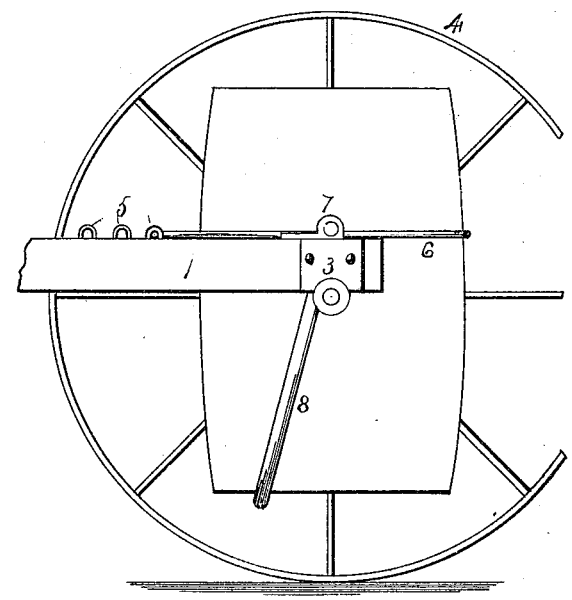

In the accompanying drawings, Figure 1 is a plan view of my improved truck. Fig. 2 is a side elevation showing the parts in the position they occupy in placing the barrel in position to be lifted. Fig. 3 is a side elevation showing the barrel elevated.

The main frame is composed of the lengthwise bars 1, held separated by the cross-bars 2. One end of each of the lengthwise bars is made rounding in handle form, and to the outside of their other ends are secured stub-axles 3, upon which are located carrying-wheels 4. To the upper face of the lengthwise bars are secured two series of staples 5. To one of each series is pivoted a bail 6. To the upper face of the lengthwise bars 1, at their ends, are secured perforated brackets 7, which support a bail 8.

When it is desired to lift a barrel, the truck is raised into substantially a vertical position, which will allow the bail 8 to rest upon the floor. One edge of the barrel is raised sufficiently to allow the bail to pass under. The bail 6 is then thrown over the barrel, when the parts will appear as shown at Fig. 2. By depressing upon the handles, the barrels will be elevated into the position shown at Fig. 3, and may be moved about. The pivot of the bail 8 is directly over the stub-axles when the parts are in the position shown at Figs. 1 and 3; but when the parts are in the position shown at Fig. 2 the pivot of the bail will be in the same horizontal plane as the stub-axles, thereby lowering the bail the distance between its pivotal connection with the main frame and the stub-axles. By means of the two series of staples 5 the bail 6 can be adjusted in the lengthwise direction of the main frame to accommodate different-sized barrels. By this construction of link the barrel is always held in an upright position, which is especially adapted for carrying liquids.

Legs 9 are connected to the lengthwise bars of the supporting-frame.

I claim as my invention—

In a barrel truck, the combination of a main frame, supporting wheels connected thereto, two bails having a pivotal connection with the main frame, one bail supporting the barrel and having its pivot eccentric to the axles of the supporting wheels, the other bail holding the barrel in an upright position, the bails forming the only means for supporting the barrel.

FLOYD H. CARTER.

Witnesses:
   A. O. BEHEL,
   E. BEHEL.